(12) United States Patent
Ren

(10) Patent No.: US 8,565,763 B2
(45) Date of Patent: Oct. 22, 2013

(54) USER DEVICE RADIO ACTIVITY OPTIMIZATION IN DEAD ZONES

(75) Inventor: Dahai Ren, Lincoln, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 58 days.

(21) Appl. No.: 13/296,794

(22) Filed: Nov. 15, 2011

(65) Prior Publication Data

US 2013/0122902 A1 May 16, 2013

(51) Int. Cl.
*H04W 4/00* (2009.01)

(52) U.S. Cl.
USPC ..... 455/434; 455/421; 455/422.1; 455/67.11; 455/440; 455/456.1; 455/574

(58) Field of Classification Search
USPC ............ 455/67.11–67.16, 456.1, 572–574, 455/421–423, 434, 436
See application file for complete search history.

(56) References Cited

U.S. PATENT DOCUMENTS

| | | | |
|---|---|---|---|
| 6,597,906 B1 * | 7/2003 | Van Leeuwen et al. ... | 455/422.1 |
| 6,650,896 B1 * | 11/2003 | Haymes et al. ............. | 455/423 |
| 6,721,572 B1 * | 4/2004 | Smith et al. ................ | 455/456.1 |
| 7,158,790 B1 * | 1/2007 | Elliott ........................... | 455/446 |
| 7,412,263 B2 * | 8/2008 | Seier ............................. | 455/567 |
| 7,555,260 B2 * | 6/2009 | Melkesetian ................ | 455/11.1 |
| 8,195,122 B1 * | 6/2012 | Kahn et al. ................. | 455/404.2 |
| 8,285,274 B2 * | 10/2012 | Ge .............................. | 455/422.1 |
| 2005/0020284 A1 * | 1/2005 | Benco et al. ............... | 455/456.6 |
| 2008/0268816 A1 * | 10/2008 | Wormald ..................... | 455/412.2 |
| 2009/0312005 A1 * | 12/2009 | Mukundan et al. ........ | 455/422.1 |
| 2013/0136102 A1 * | 5/2013 | Macwan et al. ............. | 370/331 |

OTHER PUBLICATIONS http://library.thinkquest.org/04oct/02001/work.htm, "How Cell Phones Work", Oracle Education Foundation: ThinkQuest, Projects by Students for Students, Nov. 15, 2011 (Print Date), 2 pages.

* cited by examiner

*Primary Examiner* — Sharad Rampuria

(57) ABSTRACT

A user device may determine whether the user device is located within a dead zone; periodically search, using a first process, for a cellular tower of a cellular network when the user device is not located within the dead zone; and periodically search, using a second process, for a cellular tower of the cellular network when the user device is located within the dead zone. The second process may consume less power of the user device than the first process.

17 Claims, 8 Drawing Sheets

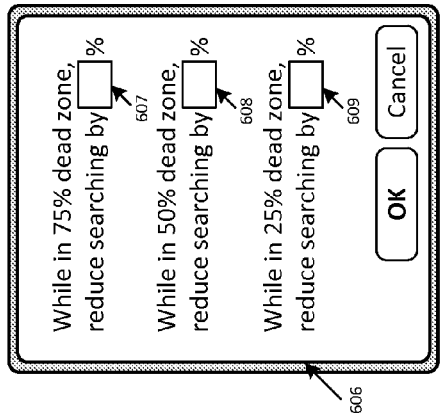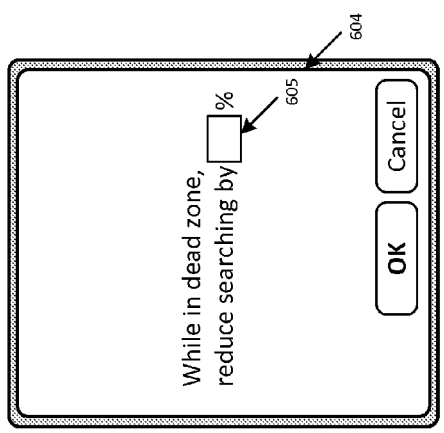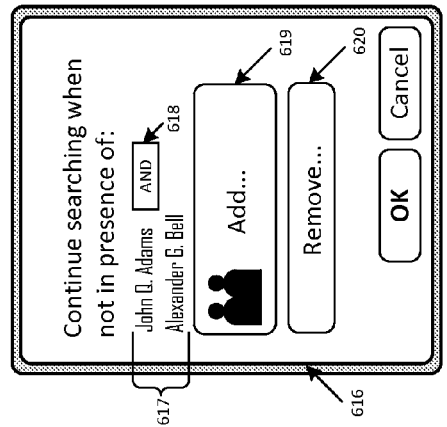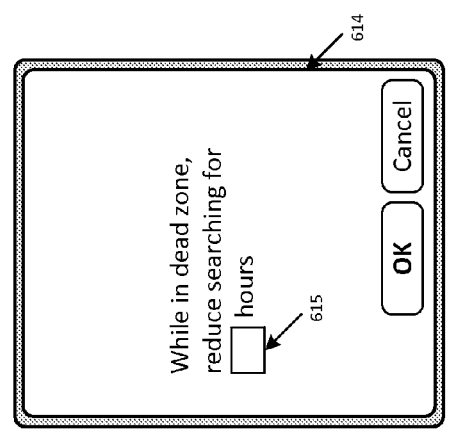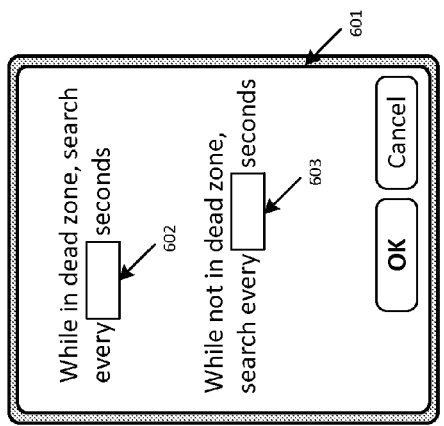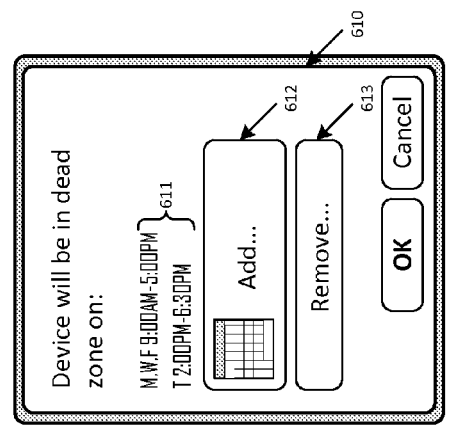

USER DEVICE RADIO ACTIVITY OPTIMIZATION IN DEAD ZONES

BACKGROUND

User devices, such as cellular telephones, may connect to cellular towers in order to communicate with a cellular network. A user device will generally continuously search for cellular towers, in order to, for example, find a cellular tower with which the user device has the best connection (e.g., the strongest signal). In some situations, a user device will be in a location in which the user device will not have a strong connection to a cellular tower (such a location may be referred to as a "dead zone"). For example, the user device may be far away from (e.g., out of range of) cellular towers with which the user device is able to communicate, objects (e.g., buildings, hilly terrain, trees, etc.) may interfere with the user device's ability to communicate with cellular towers, etc. In these situations, the user device may continue to search for cellular towers, even though there may be a reduced or non-existent chance that the user device will be able to connect to a cellular tower. Thus, some or all of the power that is consumed by the user device when searching for a cellular tower while in a dead zone situation is wasted, since it is unlikely that the user device will be able to connect to a cellular tower while in the dead zone.

BRIEF DESCRIPTION OF THE DRAWINGS

FIGS. 6A-6F illustrate example user interfaces that may be displayed by a user device, via which a user may provide parameters relating to dead zones.

DETAILED DESCRIPTION OF PREFERRED EMBODIMENTS

The following detailed description refers to the accompanying drawings. The same reference numbers in different drawings may identify the same or similar elements.

A system and/or method, described herein, may enable a user device (such as a cellular telephone, a personal digital assistant ("PDA"), a laptop computer, etc.) to modify the activity of a radio transceiver associated with the user device, based on whether the user device is located within a dead zone.

As used herein, a "dead zone" may refer to a geographic location and/or area in which a user device is not able to communicate with, or is able to communicate in only a limited capacity with, one or more devices of a network (e.g., a cellular tower of a cellular network) via a radio transceiver associated with the one or more devices of the network. For example, a user device may be inside a building, surrounded by hilly terrain, in a wooded area, etc., and may not be able to communicate with, or fully communicate with, a cellular tower of a cellular network. In such a situation, it may be considered that the user device is in a dead zone.

Figure 1A:
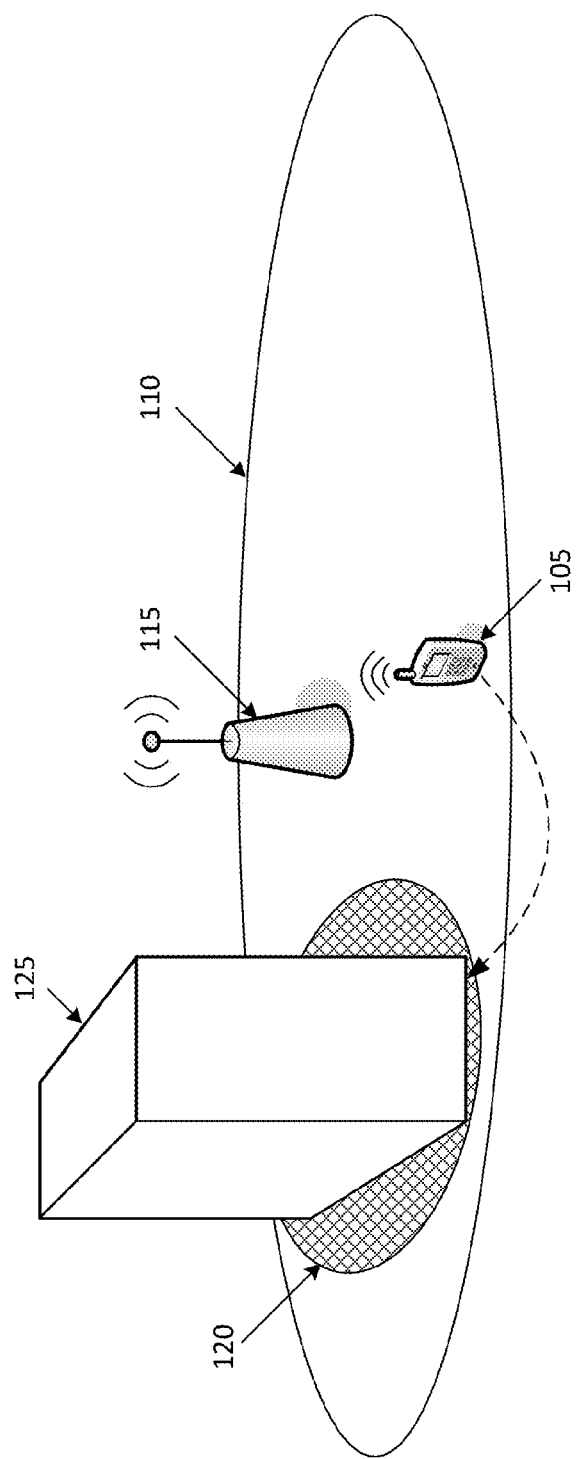
FIGS. 1A-1C illustrate an overview of an example implementation described herein.
Figure 1B:
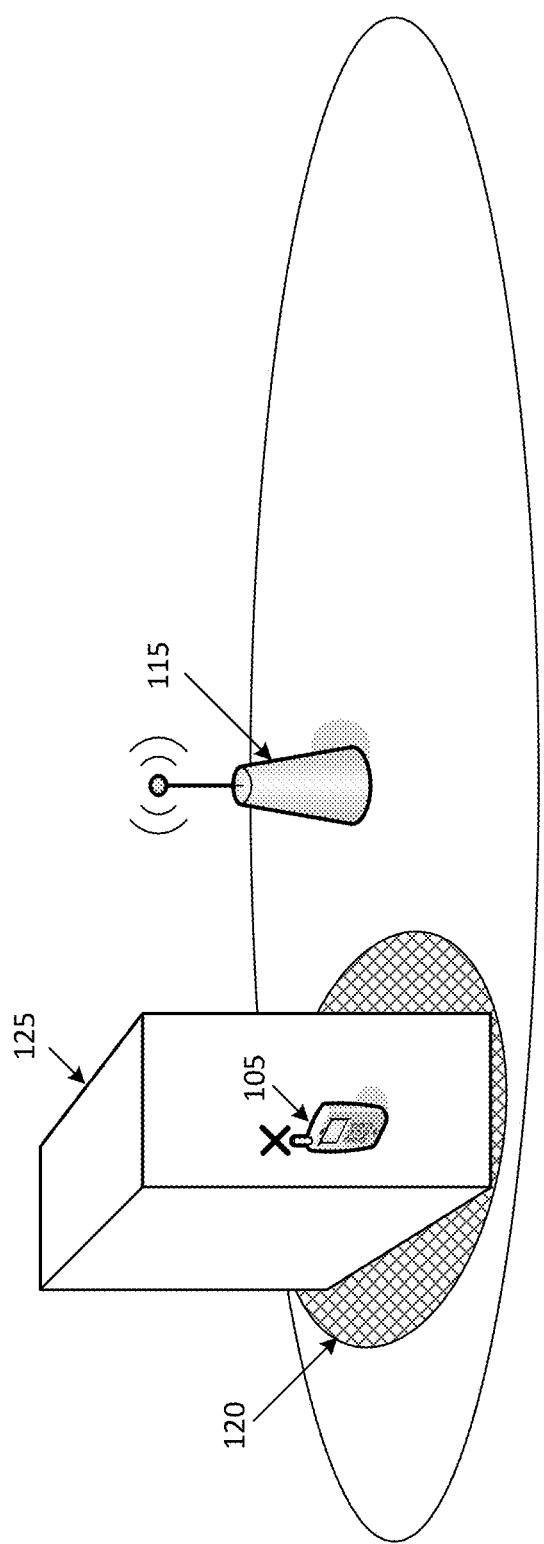
Figure 1C:
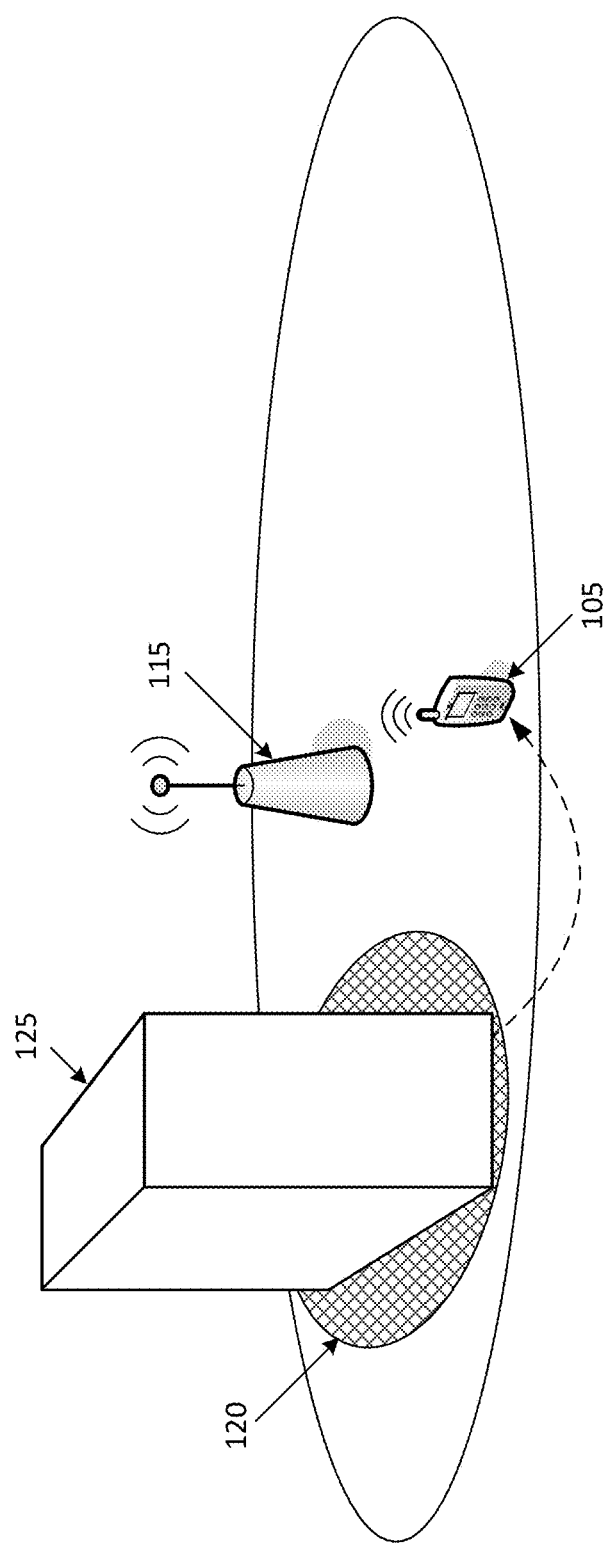

FIGS. 1A-1C illustrate an overview of an example implementation described herein. As shown in FIG. 1A, user device 105 may be within coverage area 110, which is associated with cellular tower 115. In FIG. 1A, user device 105 may be outside of dead zone 120 (which corresponds to building 125), but may be moving toward dead zone 120, as indicated by the dashed arrow. As indicated by the curved lines illustrated with user device 105, user device 105 may be in communication with cellular tower 115, and/or may be periodically searching for other cellular towers (e.g., transmitting beacon messages).

User device 105 may store information identifying dead zone 120. For example, user device 105 may have received profile information identifying dead zone 120 and/or one or more other dead zones from one or more devices (e.g., downloaded from a web site, received from another user device 105, received from a server device associated with a cellular network, etc.). Additionally, or alternatively, user device 105 may have received input from a user associated with user device 105. For example, the user may have previously entered building 125 and noticed that user device 105 indicated a weak or non-existent signal strength. The user may have provided user device 105 with information identifying that a geographical location (and/or geographical area) associated with building 125 corresponds to dead zone 120.

Additionally, or alternatively, user device 105 may have automatically identified dead zone 120. For instance, user device 105 may have previously been located in building 125, and detected a weak or non-existent signal strength. User device 105 may have automatically stored information identifying that a geographical location (and/or geographical area) associated with building 125 corresponds to dead zone 120. User device 105 may store such information without any user input. Alternatively, user device 105 may receive user input upon identifying a potential dead zone. For instance, upon detecting a weak or non-existent signal strength at a particular geographic location and/or area, user device 105 may prompt a user for permission to store information identifying the particular geographic location and/or area as a dead zone. User device 105 may also prompt the user for additional information, such as a name associated with the dead zone, an interval between which to transmit beacons when in the particular dead zone (e.g., a time interval at which to transmit the beacons), a schedule associated with an expected time that the user is in the particular dead zone, etc.

As shown in FIG. 1B, user device 105 may have entered building 125, which is located within dead zone 120. As indicated by the "X" illustrated with user device 105, user device 105 may have modified the activity of a radio transceiver associated with user device 105. For example, user device 105 may have ceased searching for cellular towers (e.g., transmitting beacons), such as cellular tower 115, via the radio transceiver. Alternatively, user device 105 may search for cellular towers on a modified schedule (e.g., may search for cellular towers, and/or transmit beacons, at a less frequent interval than when user device 105 is not in dead zone 120).

As shown in FIG. 1C, user device 105 may have moved out of building 125 (and thus, out of dead zone 120). As indicated by the curved lines illustrated with user device 105, user device 105 may resume searching for cellular towers, such as cellular tower 115 (e.g., may transmit beacons at an interval that is associated with not being located within a dead zone).

Figure 2:
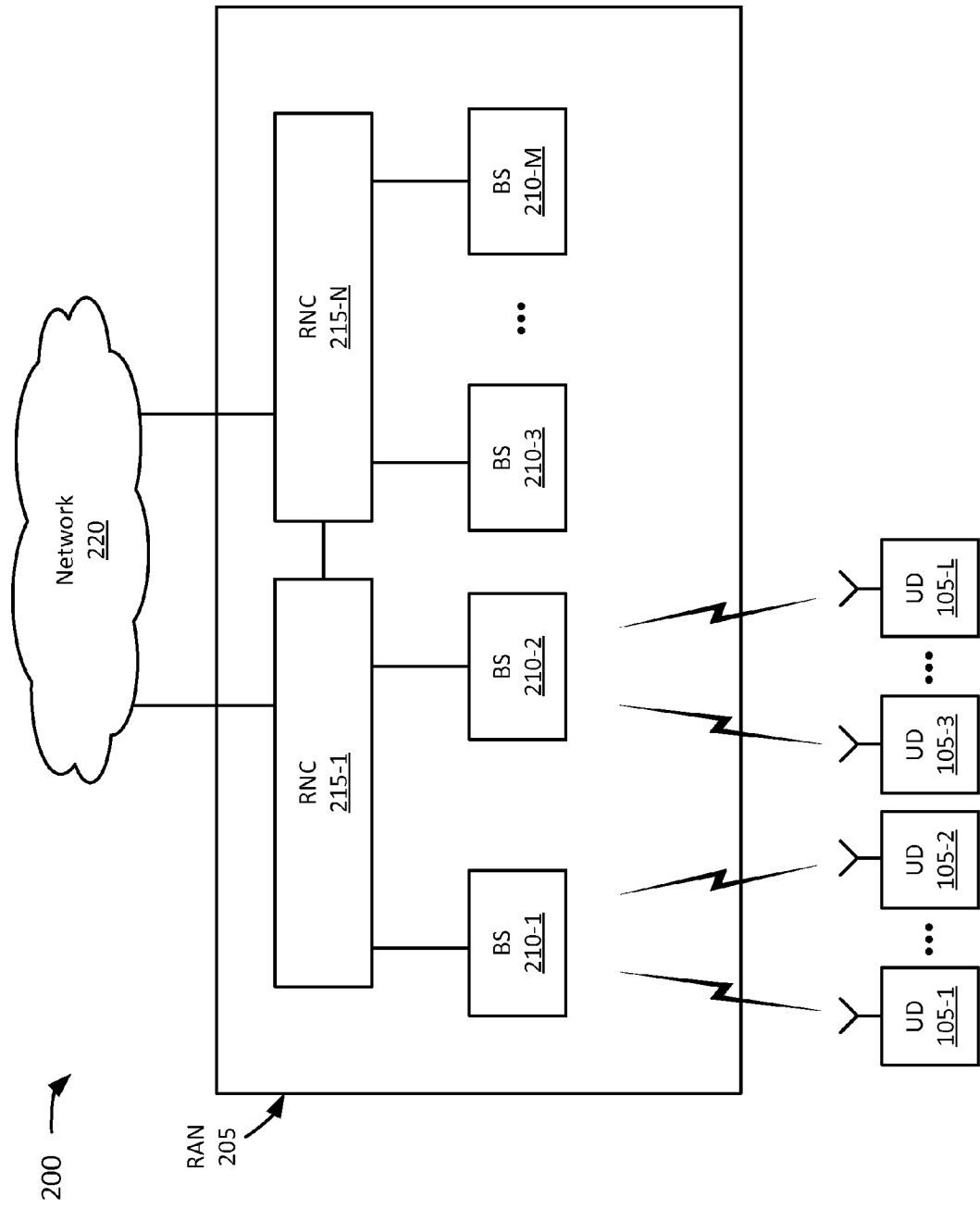
FIG. 2 is a diagram of an example system in which methods, described herein, may be implemented.

FIG. 2 depicts a diagram of an example system 200 in which systems and/or methods described herein may be implemented. As shown, system 200 may include a group of user devices 105-1 through 105-L (where L is an integer that is greater than or equal to 1) (referred to collectively as "user devices 105," and in some instances individually, as "user device 105"), radio access network ("RAN") 205, and network 220. Four user devices 105, a single RAN 205, and a single network 220 have been illustrated in FIG. 2 for simplicity. In practice, additional user devices 105, RANs 205, and/or networks 220 may be used. Also, in some instances, a component in system 200 (e.g., one or more of user device 105, RAN 205, and network 220) may perform one or more functions described as being performed by another component or group of components in system 200.

User device 105 may include one or more devices capable of sending/receiving voice and/or data to/from RAN 205. User device 105 may include, for example, a radiotelephone, a personal communications system ("PCS") terminal (e.g., a terminal that may combine a cellular radiotelephone with data processing and data communications capabilities), a PDA (e.g., a device that may include a radiotelephone, a pager, Internet/intranet access, etc.), a laptop computer, a tablet computer, etc.

RAN 205 may include one or more devices for transmitting voice and/or data to user device 105 and network 110. As illustrated in FIG. 2, RAN 205 may include a group of base stations 210-1 through 210-M (where M is an integer that is greater than or equal to 1) (referred to collectively as "base stations 210" and in some instances, individually as "base station 210"), and a group of radio network controllers ("RNCs") 215-1 through 215-N (where N is an integer that is greater than or equal to 1) (referred to collectively as "radio network controllers 215" and in some instances, individually as "radio network controller 215"). Four base stations 210 and two RNCs 215 are shown in FIG. 2 for simplicity. In practice, there may be additional or fewer base stations 210 and/or RNCs 215. Also, in some instances, a component in RAN 205 (e.g., one or more of base stations 210 and RNCs 215) may perform one or more functions described as being performed by another component or group of components in RAN 205.

RAN 205 may correspond to one or more particular technologies. For example, RAN 205 may correspond to a long term evolution ("LTE") technology. In such an example, base stations 210 may take the form of evolved node Bs ("eNBs"), and RNCs 215 may take the form of mobile management entities ("MMEs").

Each base station 210 may correspond to one or more cellular towers. A cellular tower may include one or more radio transceivers that are capable of sending and/or receiving voice and/or data to and/or from user devices 105. Base stations 210 may further include one or more network devices that receive voice and/or data from RNCs 215 and transmit the voice and/or data to/from user devices 105 via an air interface (e.g., via one or more wireless transceivers associated with base stations 210). Base stations 210 may also include one or more network devices that receive voice and/or data from user devices 105 over an air interface and transmit that voice and/or data to RNCs 215 or other user devices 105.

RNCs 215 may include one or more devices that control and manage base stations 210. Radio network controllers 215 may also include devices that perform data processing to manage utilization of radio network services. RNCs 215 may transmit/receive voice and data to/from base stations 210, other radio network controllers 215, and/or network 110.

RNC 215 may act as a controlling radio network controller ("CRNC"), a drift radio network controller ("DRNC"), and/or a serving radio network controller ("SRNC"). A CRNC may be responsible for controlling the resources of a base station 210. A SRNC may serve particular user device 105 and may manage connections towards that user device 105. A DRNC may fulfill a similar role to the SRNC (e.g., may route traffic between a SRNC and user device 105).

Network 220 may include one or more devices that transfer/receive voice and/or data to a circuit-switched and/or packet-switched network. In one embodiment, network 220 may include, for example, a Mobile Switching Center ("MSC"), a Gateway MSC ("GMSC"), a Media Gateway ("MGW"), a Serving General Packet Radio Service ("GPRS") Support Node ("SGSN"), a Gateway GPRS Support Node ("GGSN"), and/or other devices. Network 220 may be a private network, and/or a public network, such as the Internet.

Figure 3:
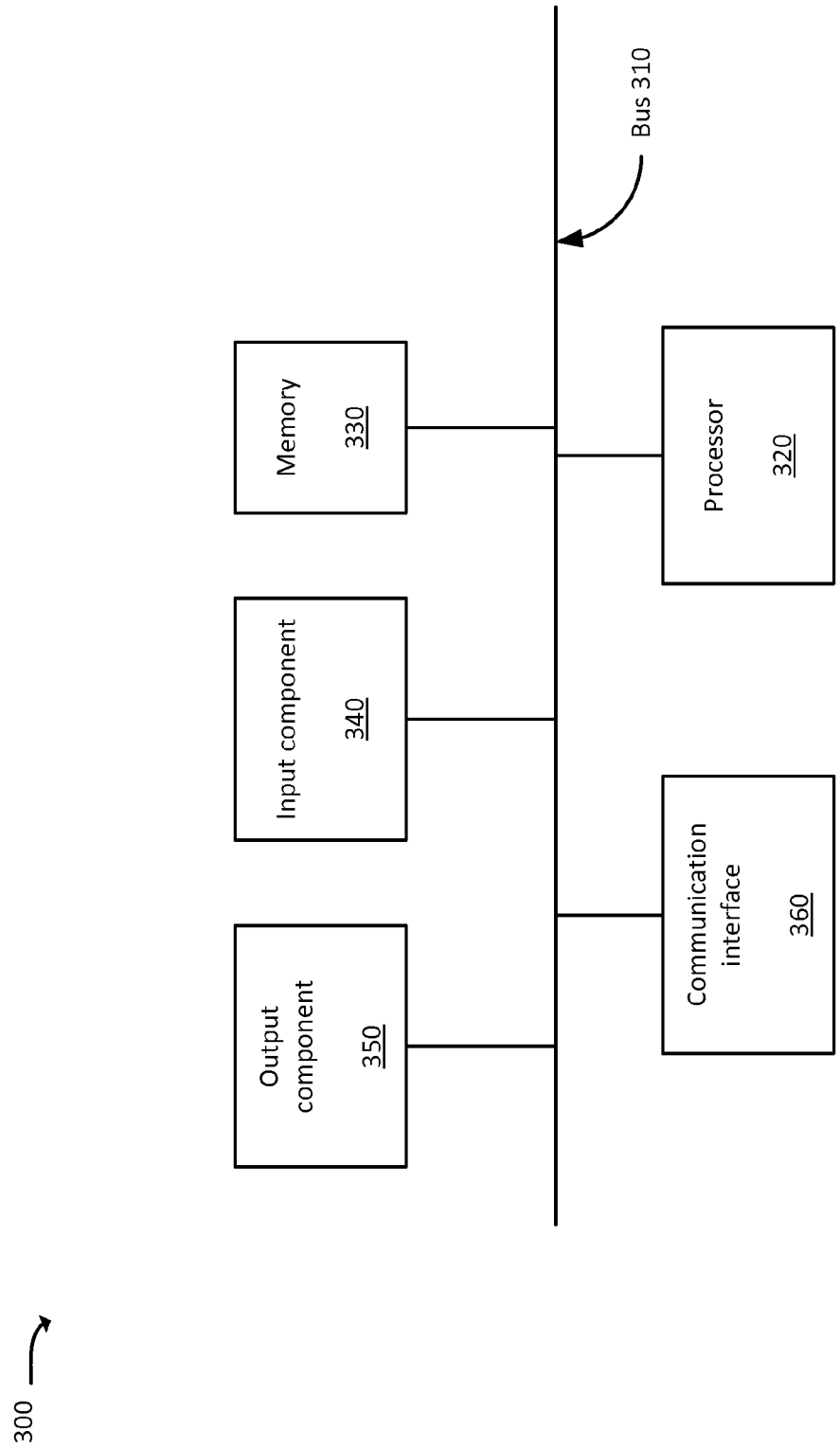
FIG. 3 is a diagram of example components of one or more devices shown in FIG. 2.

FIG. 3 is a diagram of example components of device 300. Each of the devices illustrated in FIGS. 1A-1C or 2 may include one or more devices 300. Device 300 may include bus 310, processor 320, memory 330, input component 340, output component 350, and communication interface 360. In another implementation, device 300 may include additional, fewer, different, or differently arranged components. Some non-limiting examples of device 300, with additional and/or different components, are discussed below.

Bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a microphone, a keyboard, a keypad, a button, a switch, etc. Output component 350 may include a mechanism that outputs information to the operator, such as a display, a speaker, one or more light emitting diodes ("LEDs"), etc.

Communication interface 360 may include any transceiver-like mechanism that enables device 300 to communicate with other devices and/or systems. For example, communication interface 360 may include a wireless radio transceiver, which is able to send and/or receive voice and/or data to/and or from one or more devices (e.g., a cellular tower) associated with a cellular network. Additionally, or alternatively, communication interface 360 may include an Ethernet interface, an optical interface, a coaxial interface, or the like. Communication interface 360 may additionally, or alternatively, include a wireless communication device, such as an infrared ("IR") receiver, a Bluetooth radio, or the like. The wireless communication device may be coupled to an external device, such as a headset, a remote control, a wireless keyboard, etc.

As will be described in detail below, device 300 may perform certain operations relating to modifying radio activity of a user device (e.g., user device 105). Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
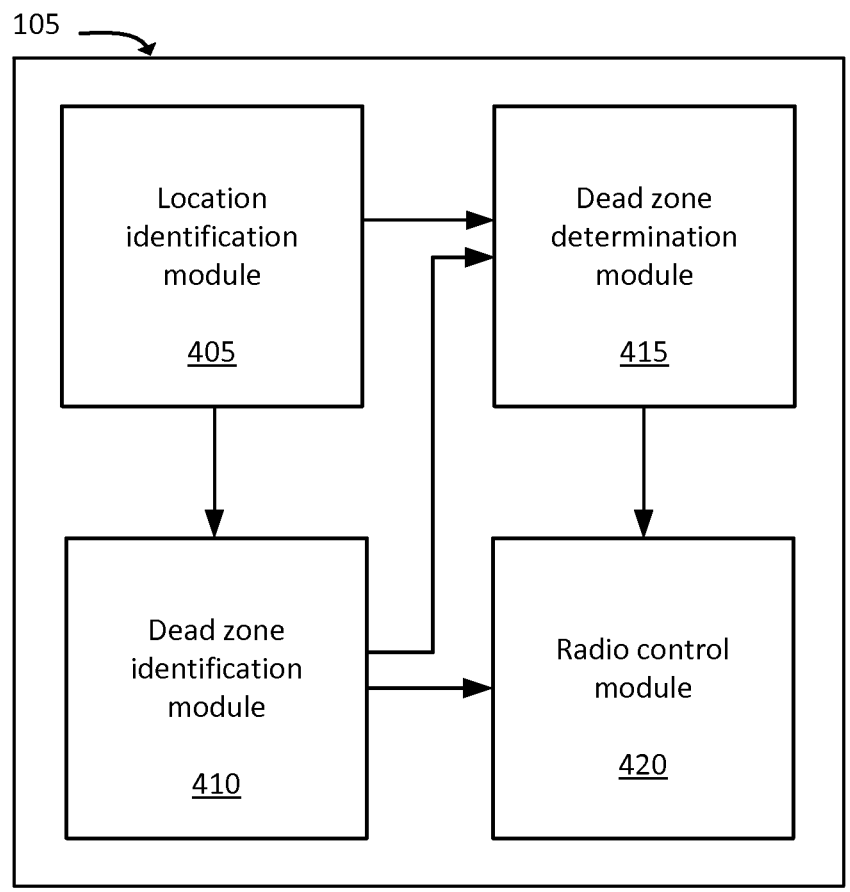
FIG. 4 is a diagram of example components of a user device shown in FIGS. 1A-1C and 2.

FIG. 4 is a diagram of example functional components of user device 105. As shown in FIG. 4, user device 105 may include modules 405-420. Any, or all, of modules 405-420 may be implemented by one or more memory devices (such as memory 330) and/or one or more processors (such as processor 320). Furthermore, multiple modules may be associated with the same memory device and/or processor (e.g., one memory device, or one set of memory devices, may store information associated with two or more of modules 405-420).

Module 405 may receive and/or store information that identifies a geographic location of user device 105. For example, module 405 may use GPS technology, cellular triangulation, or some other technique to determine the geographic location of user device 105. Module 405 may periodically determine the geographic location (e.g., every second, every minute, every half hour, etc.).

Module 410 may receive and/or store information identifying one or more dead zones. For example, module 410 may receive profile information from a server device (e.g., from an Internet server, from another user device 105, from a server device associated with a cellular network (such as from a policy charging and rules function ("PCRF"), authentication, authorization, and accounting ("AAA") server, a home subscriber server ("HSS"), or the like), etc.). Module 410 may automatically (e.g., without an explicit instruction from a user of user device 105) receive and/or retrieve the information identifying the one or more dead zones on a periodic basis (e.g., every day, every week, every month, etc.).

Additionally, or alternatively, module 410 may receive information identifying one or more dead zones via user input, in conjunction with geographic location information received from module 405. For instance, a user may provide input to user device 105 that indicates that user device 105 is currently located within a dead zone. Module 410 may store an indication that the geographic location information is associated with a dead zone.

Additionally, or alternatively, module 410 may receive information identifying one or more dead zones via user input, without using geographic location information received from module 405. For instance, a user may provide input to user device 105 that indicates a geographic location and/or area associated with a dead zone. For instance, a user may provide an address, a location on a map, latitude and longitude coordinates, or the like. Module 410 may store an indication that a geographic location, associated with the information received from the user, is associated with a dead zone.

Additionally, or alternatively, module 410 may automatically identify one or more dead zones. For instance, user device 105 may detect that a radio transceiver, associated with user device 105, has a weak or non-existent connection to a cellular tower. In other words, user device 105 may transmit one or more beacons, and determine, based on a response to the beacons (e.g., whether responses to the beacons were received from a cellular tower, how often responses to the beacons were received from a cellular tower, etc.). Upon detecting a weak or non-existent connection, module 410 may receive geographic location information from module 405, and identify that the particular geographic location is associated with a dead zone.

Module 410 may further receive and/or store additional parameters regarding identified dead zones. For example, module 410 may receive an interval parameter, which identifies a time interval between which to search for cellular towers while in a dead zone. For example, in one particular dead zone, user device 105 may have no connectivity to a cellular tower. In this dead zone, the interval parameter may identify that user device 105 should not search for cellular towers while in the dead zone.

In another example, in another dead zone, user device 105 may have limited connectivity to a cellular tower (e.g., user device 105 may receive a response to some beacons, while not receiving a response to other beacons). In this dead zone, the interval parameter may identify an interval, at which user device 105 should search for cellular towers while in the dead zone, that is different from another interval, at which user device 105 searches for cellular towers while not in the dead zone. The interval parameter may additionally, or alternatively, identify an interval at which user device 105 should search for cellular towers while not in a dead zone.

Another parameter, received by module 410 and associated with a dead zone, may be a schedule parameter, which identifies a schedule associated with one or more dead zones. For example, a user of user device 105 may enter the same dead zone (e.g., an office building) on a predictable schedule, such as Monday through Friday, from 9:00 AM-5:00 PM.

Yet another parameter, received by module 410 and associated with a dead zone, may include an area parameter, which identifies an area associated with the dead zone. For instance, the area parameter may include a point (that corresponds to a geographic location received from module 405) and a radius. Additionally, or alternatively, the area parameter may include a definition of a two-dimensional or a three-dimensional polygon (e.g., a set of geographic coordinates that correspond to vertices of the polygon).

A further parameter, received by module 410, may be a groups parameter, which identifies one or more groups of other user devices. The groups parameter may specify radio transceiver behavior when user device is in proximity of the one or more groups of other user devices. For example, the groups parameter may specify that when user device 105 is within a particular distance of one or more user devices in the one or more groups, then user device 105 is not in a dead zone. Additionally, or alternatively, the groups parameter may specify that when user device 105 is not within a particular distance of one or more user devices in the one or more groups, then user device 105 is in a dead zone. The groups parameter may be provided by a user of user device 105 (e.g., the user may select one or more contacts, stored by user device 105, to be placed in the one or more groups). Additionally, or alternatively, the groups parameter may be automatically generated by user device 105 (e.g., contacts that repeatedly contact user device 105, and/or are repeatedly contacted by user device 105, may be placed in the one or more groups).

In order to determine whether user device 105 is within a particular distance of one or devices in the one or more groups, user device 105 may periodically determine its own geographic location (e.g., using GPS, cellular triangulation, and/or other techniques). User device 105 may transmit location information, identifying its geographic location, to a server. Additionally, or alternatively, the server may determine the geographic location of user device 105 (e.g., using cellular triangulation and/or another technique). The server may also receive and/or determine the location(s) of the one or more other user devices in the one or more groups of user devices. The server may determine whether user device 105 is within a particular distance of the one or more other user devices, and notify user device 105 of whether user device 105 is within the particular distance.

Additionally, or alternatively, the server may provide information identifying the geographic location(s) of the one or more other user devices to user device 105. In such an implementation, user device 105 may compare the received information identifying the geographic location(s) of the one or more other user devices to user device 105. Additionally, or alternatively, user device 105 may directly communicate with (or attempt to communicate with) the one or more other user devices directly (via, for example, Bluetooth), in order to determine whether user device 105 is in proximity of the one or more other user devices.

These additional parameters may be based on information provided by a user. For instance, a user may provide information identifying a time, or times, that the user expects user device 105 to be located within a dead zone. Additionally, a user may provide the interval parameter, the location parameter, the groups parameter, etc. One or more of the additional parameters may additionally, or alternatively, be automatically generated by module 410. For example, module 410 may detect that user device 105 is located within a dead zone on a predictable, recurring basis (e.g., every Monday from 9:00-5:00 PM, every Tuesday from 8:00 AM-4:00 PM, every Wednesday from 2:30 PM-8:30 PM, etc.), and may generate a schedule parameter based on the detecting. Additionally, module 410 may identify that a particular percentage of beacons are being responded to by a cellular tower while user device 105 is located within a dead zone.

Module 410 may generate the interval parameter based on the particular percentage of beacons to which responses are received. For instance, if 25% of the beacons are not responded to, module 410 may increase the interval between transmitting beacons from a standard interval (e.g., an interval at which user device 105 transmits beacons when not in a dead zone, or an interval at which user device 105 normally transmits beacons when in a dead zone) by an amount that is based on 25%. As another example, if 50% of the beacons are not responded to, module 410 may increase the interval between transmitting beacons from a standard interval by an amount that is based on 50%.

Module 410 may further automatically generate the area parameter. For example, module 410 may assign a default radius (e.g., 50 meters) when a dead zone is identified. Additionally, or alternatively, module 410 may identify multiple geographic locations that are close to each other (e.g., within 5 meters of each other) at which connectivity to a cellular tower is limited or non-existent. Using such a technique, module 410 may identify edges of a dead zone (e.g., geographic locations at which connectivity improves, compared to nearby locations at which connectivity is limited or non-existent).

When automatically identifying a dead zone, module 410 may prompt a user of user device 105 for feedback, and or provide one or more notifications to the user. For example, when identifying a dead zone, module 410 may notify a user that module 410 has identified a dead zone. Module 410 may further prompt the user for approval (e.g., ask whether the user desires to identify the present location as a dead zone). Furthermore, module 410 may prompt the user for one or more of the parameters described above when automatically identifying the dead zone.

Module 415 may determine whether user device 105 is currently located within a dead zone. In order to make such a determination, module 415 may receive information from module 410, which identifies locations of dead zones, and geographic location information from module 405, which identifies a current location of user device 105. Additionally, or alternatively, module 415 may determine whether user device 105 is located within of a dead zone based on a schedule, received from module 410.

Module 420 may modify activity of a radio transceiver associated with user device 105, based on information received from modules 410 and 415. For example, module 420 may cause user device 105 to cease searching for a cellular tower (e.g., transmitting beacons) when information received from module 415 identifies that user device 105 is located within a dead zone, and when information received from module 410 identifies that user device 105 should not search for cellular towers while located within the dead zone.

In another example, module 420 may cause user device 105 to search for a cellular tower when information received from module 415 indicates that user device 105 is not located within a dead zone. In such a scenario, module 420 may cause user device 105 to search for a cellular tower at an interval that is associated with not being located within a dead zone. In one implementation, this interval may be based on information received from module 410.

In yet another example, module 420 may cause user device 105 to search for a cellular tower at a different interval (e.g., an interval that is different from an interval associated with not being located in a dead zone) when information, received from module 415, identifies that user device 105 is located within a dead zone, and when information from module 410 indicates the different interval.

When module 420 modifies activity of the radio transceiver, module 420 may further cause user device 105 to notify a user that module 420 is modifying the activity of the radio transceiver. For example, module 420 may cause user device 105 to present a visual notification (e.g., one or more words and/or images, a flashing light on user device 105, etc.) and/or an audio notification, based on the activity of the radio transceiver being modified. Additionally, or alternatively, module 420 may cause user device 105 to seek the user's approval before modifying the activity of the radio transceiver.

Although FIG. 4 shows example modules of user device 105, in other implementations, user device 105 may include fewer, different, or additional modules than depicted in FIG. 4. In still other implementations, one or more modules of user device 105 may perform the tasks performed by one or more other modules of user device 105.

Figure 5:
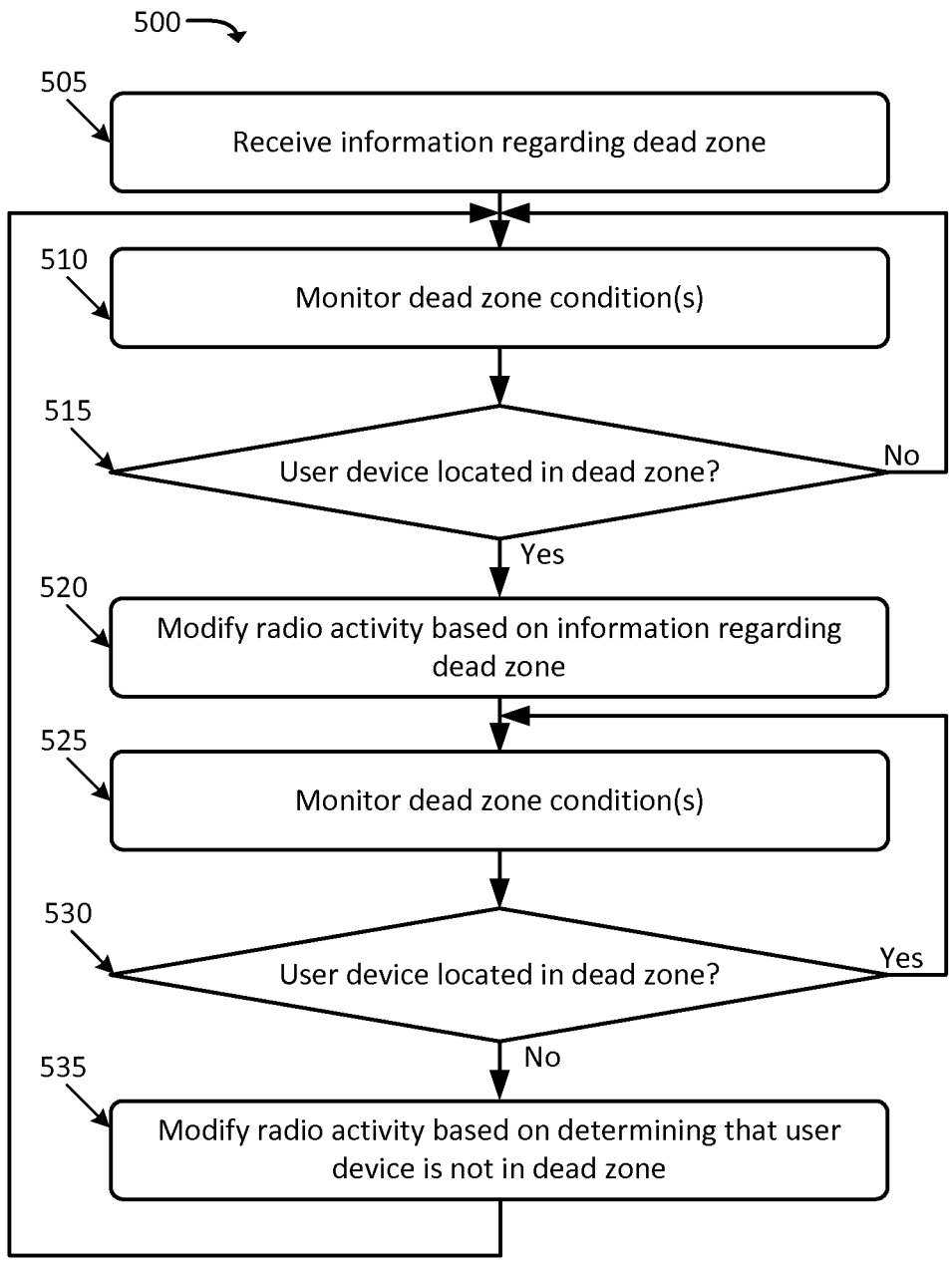
FIG. 5 is a diagram of an example process for modifying radio activity of a user device based on whether the user device is in a dead zone.

FIG. 5 shows an example process 500 for controlling a radio transceiver of a user device based on whether the user device is located within a dead zone. In one example implementation, process 500 may be performed by user device 105. In another example implementation, some or all of process 500 may be performed by a device or collection of devices separate from, or in combination with, user device 105.

Process 500 may include receiving information regarding a dead zone (block 505). Some examples of information regarding dead zones are described above with respect to information that may be received and/or stored by module 410. For example, user device 105 may receive information identifying a geographic location and/or area associated with one or more dead zones, a schedule that identifies when user device 105 is expected to enter a dead zone, etc. The received information may further include one or more parameters regarding one or more dead zones. For example, the parameters may include an interval parameter, a schedule parameter, an area parameter, a groups parameter, etc.

Process 500 may also include monitoring one or more dead zone conditions (block 510). For example, user device 105 may monitor (e.g., periodically determine) a geographic location at which user device 105 is located. In order to monitor its geographic location, user device 105 may use GPS technology, cellular triangulation, or some other technique. Additionally, or alternatively, user device 105 may monitor a time (e.g., time of day, day of week, month, etc.).

Process 500 may further include determining whether user device 105 is located within a dead zone (block 515). For example, user device 105 may determine whether one or more of the dead zone conditions (monitored at block 510) is met. In order to make this determination, user device 105 may compare the monitored dead zone condition(s) to information regarding dead zones (received at block 505). For instance, user device 105 may determine whether a geographic location of user device 105 is associated with one or more dead zones. Additionally, or alternatively, user device 105 may determine whether a current time (e.g., time of day, day of week, month, etc.) corresponds to a scheduled time when user device 105 is expected to be located in a dead zone.

If user device 105 is not located in a dead zone (e.g., if no dead zone conditions have been met (block 515—NO)), then process 500 may include continuing to monitor one or more dead zone conditions (at block 510). If, on the other hand, user device 105 is located in a dead zone (block 515—YES), then process 500 may additionally include modifying radio activity based on information regarding the dead zone in which user device 105 is located (block 520).

For example, user device 105 may modify an interval at which a radio transceiver searches for cellular towers (e.g., transmits beacons). As discussed above, user device 105 may modify the interval based on an interval parameter associated with the identified dead zone. In one implementation, user device 105 may cease searching for cellular towers, via the radio transceiver, while in the dead zone. In this situation, user device 105 may switch the radio transceiver to a low-power or a no-power state (e.g., a state in which the radio transceiver consumes less power than the radio transceiver consumes when searching for cellular towers, or no power).

As discussed above, user device 105 may notify a user of user device 105 that the activity of the radio transceiver (e.g., the interval between which user device 105 searches for cellular towers, via the radio transceiver) is being modified. For instance, user device 105 may provide a visual and/or an audio alert to the user. User device 105 may further request the user's authorization before modifying the activity of the radio transceiver. In such an implementation, user device 105 may not modify the activity of the radio transceiver until receiving user input indicating that the user authorizes the modified activity.

Further still, user device 105 may request information from the user, when modifying the activity of the radio transceiver. For instance, user device 105 may request that the user specify how the user desires the activity of the radio transceiver to be modified (e.g., user device 105 may request the user to specify an interval between which user device searches for cellular towers, via the radio transceiver).

Process 500 may further include monitoring one or more dead zone conditions (block 525). For example, user device 105 may continue to monitor dead zone conditions, as similarly described with respect to block 510. As mentioned above, the monitored dead zone conditions may include a geographic location of user device 105, a time, etc.

Process 500 may also include determining whether user device 105 is located within a dead zone (block 530). For example, user device 105 may determine, based on the monitored dead zone conditions and the information regarding the dead zone (received at block 505), whether user device 105 is still located within the dead zone.

If user device 105 is still located within the dead zone (block 530—YES), then process 500 may include continuing to monitor one or more dead zone conditions (at block 525). If, on the other hand, user device 105 is no longer located within the dead zone (block 530—NO), then process 500 may additionally include modifying radio activity based on determining that user device 105 is not in a dead zone (block 535).

For example, user device 105 may search for cellular towers, using the radio transceiver, according to an interval that is not associated with dead zones. In an implementation where the radio transceiver was placed in a low-power or a no-power state while in the dead zone, user device 105 may place the radio transceiver in a state that consumes more power than the low-power or no-power state.

While the above examples are described in the context of a single radio transceiver, user device 105 may be associated with multiple radio transceivers. The above-described implementations may apply to some or all of the radio transceivers associated with user device 105, either in connection with, or independently of one another. For example, user device 105 may be associated with a first radio transceiver that communicates with cellular towers that are associated with LTE technology, and a second radio transceiver that communicates with cellular towers that are associated with a code division multiple access 2000 ("CDMA2000") technology. Assume that user device 105 enters a geographic area that is a dead zone with respect to LTE technology (e.g., the first radio transceiver has limited or no connectivity with LTE cellular towers), but is not a dead zone with respect to CDMA2000 technology (e.g., the second radio transceiver has at least a threshold amount of connectivity with CDMA2000 towers).

In such a scenario, user device 105 may treat the first radio transceiver differently from the second radio transceiver. For example, user device 105 may modify the activity (e.g., increase the interval of transmitting beacons according to LTE technology, or cease transmitting beacons according to LTE technology) of the first radio transceiver, but not the second radio transceiver.

Additionally, or alternatively, user device 105 may treat multiple radio transceivers the same way, if user device 105 is in a dead zone with respect to one of the radio transceivers. For example, assume again that user device 105 enters a geographic area that is a dead zone with respect to LTE technology, but is not a dead zone with respect to CDMA2000 technology. In this example, user device 105 may modify the activity of the first radio transceiver and the second radio transceiver.

FIGS. 6A-6F illustrate example user interfaces, that may be presented by user device 105, through which a user may provide parameters relating to dead zones. For example, as shown in FIG. 6A, user device 105 may present user interface 601, which allows a user to provide an interval parameter. For example, user interface 601 may include input field 602 (e.g., text input box, list menu, combo box, etc.), which allows a user to provide an interval parameter that indicates how often user device 105 will search for a cellular tower when user device 105 is in a dead zone. User interface may also include input field 603, which allows a user to provide an interval parameter that indicates how often user device 105 will search for a cellular tower when user device 105 is not in a dead zone.

While example user interface 601 displays interval parameters in terms of seconds, other example user interfaces may display intervals in terms of other units, such as tenths of a second, hundredths of a second, minutes, etc. Additionally, other example user interfaces may allow a user to provide a different interval parameter for each dead zone, of a group of dead zones. For example, one dead zone may be associated with one interval parameter, while another dead zone may be associated with another interval parameter.

As shown in FIG. 6B, user device 105 may present user interface 604, which allows a user to provide an interval parameter in a different manner than in user interface 601. For example, user interface 604 may include input field 605, which allows a user to provide an interval parameter in terms of a percentage. The percentage may indicate a percentage of a standard interval, or rate, at which user device 105 normally searches for cellular towers (e.g., the standard interval may correspond to how often user device 105 searches for cellular towers while not in a dead zone, how often user device 105 normally searches for cellular towers while in a dead zone, etc.).

As shown in FIG. 6C, user device 105 may present user interface 606, which allows a user to provide interval parameters for different levels of dead zones. For example, user interface 606 may include input fields 607-609. Each of input fields 607-609 may be associated with a different level of dead zone. For example, a user may specify a value in input field 607, which may be associated with a dead zone, for which a response to 75% of sent beacons is received. Assume user has provided the input of "25." User device 105 may reduce a rate of searching (from a standard rate, or interval) for a cellular tower by 25% when user device 105 is in such a dead zone.

While user interface 606 is illustrated in terms of percentages, other techniques may be used in other example user interfaces. For example, other user interfaces may allow a user to specify an interval at which the user desires user device 105 to search for a cellular tower while in a particular level of dead zone.

As shown in FIG. 6D, user device 105 may present user interface 610, which allows a user to provide a schedule parameter. User interface 610 may include an identification 611 of time(s) that have been selected by the user, as times that user device 105 is expected to be in a dead zone. User interface 612 may further include an option, such as button 612, to allow user to add additional days, dates, and/or times that user device 105 is expected to be in a dead zone. For example, selecting button 612 may display a calendar and/or a clock, which may allow the user to select one or more days, dates, and/or times that user device 105 is expected to be in a dead zone. Additionally, or alternatively, user device 610 may allow a user to input text, corresponding to one or more days, dates, and/or times that user device 105 is expected to be in a dead zone. User interface 610 may further include an option, such as button 613, to remove one or more days, dates, and/or times, that have been previously identified as corresponding to when user device 105 is expected to be in a dead zone.

While user interface 610 is described in the context of allowing a user to identify when user device 105 is expected to be in a dead zone, other example user interfaces may allow a user to identify when user device 105 is expected not to be in a dead zone. During these scheduled times, user device 105 may search for cellular towers in a manner that is consistent with user device 105 not being in a dead zone (e.g., may search at a non-reduced rate).

As shown in FIG. 6E, user device 105 may present user interface 614, which allows a user to provide a schedule parameter in a different manner than is facilitated by user interface 610. For example, user interface 614 may include input field 615, which may allow a user to specify that once user device 105 is in a dead zone, the user wishes user device 105 to resume searching for a cellular tower, as if user device 105 were not in a dead zone, after a particular amount of time. Although user interface 614 is illustrated in terms of hours, other example user interfaces may present the option in terms of other units of time, such as seconds, minutes, etc.

As shown in FIG. 6F, user device 105 may present user interface 616, which allows a user to provide a groups parameter. For example, user interface 616 may include an identification 617 of contacts, which the user has already identified in a group. User interface 616 may also include one or more selectable/modifiable items, such as indicator 618, which identifies a Boolean condition regarding the group. For example, as shown in FIG. 6F, indicator 618 may indicate that the user has selected "AND." Thus, user device 105 may continue searching for a cellular tower (and/or may consider itself as not within a dead zone) when not in the presence of "John Q. Adams" and when not in the presence of "Alexander G. Bell."

User interface 616 may also include an option, such as button 619, to add additional contacts to the group. When a user selects button 619, user device 105 may display a list of contacts, stored by user device 105, from which the user may select. Additionally, or alternatively, a user may provide text input that identifies one or more contacts. Further, user interface 616 may include an option, such as button 620, to remove one or more of the identified contacts.

While example user interfaces 601, 605, 606, 610, 614, and 616 were described above with respect to FIGS. 6A-6F, user device 105 may present additional, different, or fewer user interfaces. Further, user device 105 may present some, or all, of user interfaces 601, 605, 606, 610, 614, and 616 in response to a user selection to input parameters with regard to dead zones.

The device(s) and processes described above allow a user device to more intelligently search for cellular towers. When a user device is in a known dead zone, the user device may cease searching for cellular towers, or search for cellular towers on a reduced basis. Searching for cellular towers accordingly saves power that would be consumed by the user device if the user device were to continue searching for cellular towers as normal, while in a dead zone.

The foregoing description of implementations provides illustration and description, but is not intended to be exhaustive or to limit the possible implementations to the precise form disclosed. Modifications and variations are possible in light of the above teachings or may be acquired from practice of the implementations. For example, while a series of blocks has been described with regard to FIG. 5, the order of the blocks may be modified in other implementations. Further, non-dependent blocks may be performed in parallel. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   storing, by a user device, information regarding geographic locations of a plurality of dead zones;
   determining, by the user device, whether the user device is located within a particular dead zone, of the plurality of dead zones, where determining whether the user device is located within the particular dead zone includes:
      determining whether a geographic location of the user device is within a geographic area associated with the particular dead zone, where determining whether the geographic location of the user device is within the geographic area associated with the particular dead zone includes:
         comparing the geographic location of the user device to the stored information regarding the geographic locations of the plurality of dead zones;
   periodically searching, by the user device and using a first process, for a cellular tower of a cellular network when the user device is not located within the particular dead zone; and
   periodically searching, by the user device and using a second process, for a cellular tower of the cellular network when the user device is located within the particular dead zone,
   where the second process consumes less power of the user device than the first process.

2. The method of claim 1, where determining whether the user device is located within the particular dead zone further includes:
   determining whether a present time is within a time period associated with the particular dead zone.

3. The method of claim 1, where the user device is associated with a first radio transceiver and a second radio transceiver, where the first and second radio transceivers are different, where the cellular network is a first cellular network,
   where periodically searching for a cellular tower of the cellular network using the second process includes concurrently:
      periodically searching for a cellular tower of the first cellular network, via the first radio transceiver, using the second process, and
      periodically searching for a cellular tower of a second cellular network, via the second radio transceiver, using the first process.

4. The method of claim 1, where periodically searching for a cellular tower of the cellular network, using the first process, includes:
   periodically searching for a cellular tower of the cellular network at a first rate, and
   where periodically searching for a cellular tower of the cellular network, using the second process, includes:
   periodically searching for a cellular tower of the cellular network at a second rate that is different from the first rate.

5. The method of claim 4, where the second rate is slower than the first rate.

6. The method of claim 1, further comprising:
   receiving rate information, associated with the particular dead zone, from a user of the user device,
   where periodically searching for a cellular tower of the cellular network using the second process includes:
      periodically searching for a cellular tower of the cellular network at a rate that is based on the receive rate information.

7. The method of claim 1, where the particular dead zone is a first dead zone, the method further comprising:
   determining that the user device is located within a second dead zone that is different from the first dead zone; and
   ceasing to search for a cellular tower of the cellular network when the user device is located within the second dead zone.

8. The method of claim 1, where the particular dead zone is a first dead zone, the method further comprising:
   determining that the user device is located within a second dead zone that is different from the first dead zone; and
   periodically searching, by the user device and using a third process, for a cellular tower of the cellular network based on determining that the user device is located in the second dead zone, where the third process is different from the first and second processes.

9. A user device, comprising:
   one or more memory devices storing:
      computer-executable instructions, and
      information regarding geographical locations that correspond to one or more dead zones; and
   one or more processors to execute the computer-executable instructions to:
      determine a geographical location of the user device;
      compare the determines geographical location of the user device to the stored information regarding the geographical locations that correspond to the dead zones;
      determine, based on the comparing, whether the user device is located within a particular dead zone, of the one or more dead zones;
      periodically search, at a first rate, for a cellular tower of a cellular network when the user device is not located within the dead zone; and
      periodically search, at a second rate, for a cellular tower of the cellular network when the user device is located within the particular dead zone, where the second rate is different from the first rate.

10. The user device of claim 9, where periodically searching at the second rate consumes less power of the user device than periodically searching at the first rate.

11. The user device of claim 9, where when determining whether the user device is located within the particular dead zone, the one or more processors are further to:
   determine whether a present time is within a time period associated with the particular dead zone.

12. The user device of claim 9, further comprising:
   a first radio transceiver; and
   a second radio transceiver that is different from the first radio transceiver,
   where when periodically searching for a cellular tower of the cellular network at the second rate, the one or more processors are to concurrently:
      periodically search for a cellular tower of the cellular network, via the first radio transceiver, at the second rate, and
      periodically search for a cellular tower of another cellular network, via the second radio transceiver, at the first rate.

13. The user device of claim 9, where the second rate is zero.

14. The user device of claim 9, where the one or more processors are further to:
receive rate information, associated with the particular dead zone, from a user of the user device,
where the second rate is based on the received rate information, and
where the first rate is not based on the received rate information.

15. The user device of claim 9, where the particular dead zone is a first dead zone, where the one or more processors are further to:
determine that the user device is located within a second dead zone that is different from the first dead zone; and
cease to search for a cellular tower of the cellular network when the user device is located within the second dead zone.

16. A non-transitory computer-readable medium, comprising:
a plurality of computer-executable instructions, which when executed by one or more processors of a user device, cause the one or more processors to:
retrieve, from a storage, information regarding geographic locations of a plurality of dead zones;
determine whether the user device is located within a particular dead zone, of the plurality of dead zones, where the computer-executable instructions, of the plurality of computer-executable instructions, that cause the one or more processors to determine whether the user device is located within the particular dead zone further cause the one or more processors to:
periodically monitor a geographic location of the user device, and
determine, based on the periodically monitored geographic location of the user device, whether the user device is within a geographic area associated with the particular dead zone, where the computer-executable instructions, of the plurality of computer-executable instructions, that cause the one or more processors to determine whether the user device is located within the geographic area associated with the particular dead zone, further cause the one or more processors to:
compare the geographic location of the user device to the retrieved information regarding the geographic locations of the plurality of dead zones;
periodically search for a cellular tower of a cellular network when the user device is not located within the dead zone; and
cease searching for a cellular tower of the cellular network when the user device is located within the dead zone.

17. The non-transitory computer-readable medium of claim 16, where the plurality of computer-executable instructions further cause the one or more processors to:
place a radio transceiver of the user device, that is associated with searching for a cellular tower of the cellular network, in a low-power or a no-power state when the user device is located within the particular dead zone.

* * * * *